Patented Feb. 14, 1928.

1,659,131

UNITED STATES PATENT OFFICE.

OAKLEY M. BISHOP, OF WILMINGTON, DELAWARE, AND MERVILLE S. THOMPSON, OF PENNS GROVE, NEW JERSEY, ASSIGNORS TO E. I. DU PONT DE NEMOURS & COMPANY, OF WILMINGTON, DELAWARE, A CORPORATION OF DELAWARE.

DYE POWDER AND PROCESS OF MANUFACTURE.

No Drawing. Application filed June 6, 1925. Serial No. 35,478.

This invention relates to dye powders and processes for their manufacture and specifically to the manufacture of colloidal-like dye powders in a fine state of subdivision, which, in addition to "wetting-out" readily, have to a remarkable degree the property of dispersing when added to water to produce a colloidal solution of the water insoluble dye comparable to a very dilute suspension of the original paste. Among the advantages of these dye powders over the pastes are the considerations of ease and accuracy of standardization, elimination of the danger of freezing in cold weather and reduction of shipping costs due to the more convenient and concentrated form of the powder.

In the application of M. S. Thompson, Serial No. 623,016, filed March 5, 1923, a process was set forth whereby a colloid-like dye paste can be converted into a powder which still retains its colloid-like properties and which when added to water "wets-out" readily and disperses to an extremely fine suspension. This process, however, involved drying at reduced pressures. We have now found that dry powders possessing the same properties can be produced by the method disclosed herein.

Dye powders as produced at the present time comprise two types, namely, "paper powders" for the commercial coloring of paper and "textile powders" adapted for "vatting", a chemical treatment more fully described hereinafter which results in the transformation of the water insoluble powder into a true solution.

We have discovered that for the successful application of the first type or "paper powder", it is extremely important that the dry colloid-like powder have the property of rapid dispersion to as high degree as possible to produce with water a colloidal solution of the insoluble dye. In such a solution the particles of dye should be too finely divided to be seen with the eye when a dilute suspension of the color is held against the light. The advantage of such a powder over the ordinary powder is at once apparent. Due to its property of dispersion and to the fine state of subdivision of its solid particles, not only a uniform distribution of the powder is quickly attained and spots of concentrated color avoided, but a maximum covering power results which is of great importance when the dye is employed in commercial processes for dyeing paper.

Likewise in the employement of the textile powders, which must be "vatted" before they can be applied, it is also very advantageous to have the powder easily wetted and capable of rapid dispersion into an extremely fine suspension. Otherwise, when the color, before use, is subjected to the process of vatting, which comprises treatment with dilute caustic soda and a reducing agent, such as sodium hydrosulfite, the reaction will be slow and an incomplete solution formed.

With the above requirements in mind, we have produced a novel dye powder having these properties in high degree, and have developed a method for its manufacture. We have found that dry colloid-like powders possessing these desirable properties to a degree far beyond any powders known before our discoveries can be produced by adding to the ordinary colloid-like dye pastes prepared from the plant press cake which usually contains more than 20% of dye by mixing water therewith, a substance such as a soap or any other well known foaming agent which may or may not have the properties of a dispersoid, together with other diluents such as sugars including glucose and lactose and substances highly soluble in water as urea and dextrines, glues and other protective colloids. When the soap has been dissolved in the dye paste, together with the other fillers, the entire mass is beaten up with rapid agitation into a stiff foam. A cubic centimeter of this foam will contain thousands of minute air bubbles, and it can be seen that this mass will possess an enormous surface exposed to the air. It is, nevertheless, a surprising fact how quickly this foam will dry when exposed in the well known air circulating ovens or even in the open air at moderate temperatures; reduced pressures are unnecessary. The dry porous product which is literally honeycombed with minute cavities can be readily ground to any state of subdivision desired.

Any one of a large number of dyes may be employed as the color constituent of our new powders and the following anthraquinone vat dies are listed merely as illustrative:

| Schultz No. | Dye |
|---|---|
| 837 | N-dihydro-1:2:1′:2′-anthraquinone azine. |
| 842 | Dichlor N-dihydro-1:2:1′:2′-anthraquinone azine. |
|  | Polychlor N-dihydro-1:2:1′:2′-anthraquinone azine. |
| 840 | New blue from indanthrone. |
| 849 | Flavanthrone. |
| 766 | Isoviolanthrone. |
| 767 | Dichlor isoviolanthrone. |
| 763 | Violanthrone. |
| 765 | Nitro violanthrone. |
| 760 | Pyranthrone. |
| 761 | Dichlor pyranthrone. |
| 827 | Dichlor di-alpha-anthraquinonyl-2:7-diamino-anthraquinone. |
| 831 | Anthraquinone naphthacridone. |
| 832 | Anthraquinone diacridone. |
| 871 | Anthraquinone monacridone. |

Other examples of suitable dyes are:

Phospho tungstic lakes of basic colors, such as the phospho tungstic lake of pentamethyl-triamino-triphenylmethane.

Thio indigos and their derivatives.

Thio naphthene indol indigos.

Thio naphthene ace naphthene indigos.

Indigos and indigoids.

The following specific example will serve to illustrate our process as applied to the anthraquinone vat dyes in the manufacture of paper dyes:

100 pounds of a paste of colloid-like N-dihydro-anthraquinone azine of about 30% solid dye is mixed with 40 pounds of sucrose or other highly soluble filler, 15 pounds of dextrine or other like substance such as glue, and 15 pounds of a foam producing substance such as sodium stearate. The thick magma which may or may not be further concentrated at this point is then beaten until a stiff foam is obtained and the volume of the mass has increased one or more times. The foamy mass is then dried at ordinary or higher temperatures, and is ready for grinding.

We desire to emphasize that, in the working of the above embodiment of our process, each of the diluents, besides being a filler, has a definite function. The soap functions as a dispersing agent, as a protective colloid, and as a foam producer. The dextrine functions as a protective colloid and also as a thickening agent. The dextrine appears, also, to assist in causing a foam to set-up while drying. The sucrose functions as a protective colloid and also to render the diluents more soluble in water.

But instead of employing all of the above mentioned components it is possible to produce dry colloid-like powders by using only soap and a protective colloid such as dextrine. For example dry colloid-like flavanthrone, or isoviolanthrone, can be obtained of which the following is an example, it being understood that we do not confine ourselves to the exact proportions or materials hereinafter mentioned:

200 pounds of dye paste of suitable fineness containing about 50 pounds of solid dye are placed in a metal pot provided with an efficient mechanical agitator capable of revolving at varying speeds. Sufficient water is added to reduce the paste to a thin, slurry consistency with slow agitation. 75 pounds of a soap, such as sodium stearate, are then added and the mass heated to 50–60° C. to insure a complete solution of the soap. 125 pounds of dextrine are then added and the temperature of the mass is slowly lowered while the speed of the revolving agitator is increased to about 80–100 revolutions per minute. The mass gradually swells until finally the volume is several times that of the original. The mass now resembles an extremely stiff lather. One cubic centimeter of this foam contains thousands of minute air bubbles. The mass may be dried in the open air or in the ordinary commercial hot air circulating ovens. When dry, the powder can be ground to any state of subdivision desired.

The flavanthrone powder produces a bright yellow shade and the isoviolanthrone a bright violet shade on paper. The colors are very uniform and no specks are visible to the human eye.

With certain modifications we are also able to produce textile powders which possess a marked degree of dispersion in water. The following is merely an example and we do not confine ourselves to these definite proportions:

200 pounds of the chlor derivative of N-dihydro-1:2:1′:2′-anthraquinone azine, or other dye, in the form of a suitable paste containing 42 pounds of dry dye are placed in a commercial mixer and heated to 50° C. 15 pounds of a soap, such as sodium stearate, are then added. After the soap has completely dissolved, 25 pounds of sucrose are added and the temperature is gradually lowered. As the magma becomes permeated with minute air bubbles it swells. After the volume has become about two times the original the magma is run into pans and dried in the open air or in the ordinary commercial hot air ovens. The dry material can be ground to any desired fineness and standardized in the usual manner. When added to water this powder spreads rapidly over the surface, sinks readily, and gives an unusual amount of color to the water due to its dispersive properties. This powder vats very readily in the presence of dilute caustic soda and a reducing agent such as sodium hydrosulfite.

Although described in detail above, it will be understood that our invention is not limited to ingredients or proportions as set forth in the examples or to the exact conditions specified in setting forth embodiments of our preferred procedure. Care should, however, be taken to avoid such a small proportion of protective colloid as would permit crystallization of the sucrose or other diluent.

We claim:

1. In a process for preparing a finely divided dye powder from insoluble coloring material the steps of mixing with said material a foaming agent, agitating to produce a foam and drying the foam.

2. A process for preparing a finely divided dye powder comprising the steps of treating an aqueous dye paste to produce a foam and reducing the foam to a dry powder.

3. A process for preparing a finely divided dye powder comprising the steps of treating an aqueous dye paste to produce a foam, drying said foam to a porous mass and reducing said mass to a dry powder.

4. A process for preparing a finely divided dye powder from insoluble organic coloring material which comprises mixing soap therewith, beating to produce a lather, drying said lather to a porous mass and reducing said mass to a pulverulent state.

5. In a process for preparing a finely divided dye powder from an aqueous dye paste the step of converting said paste to a froth.

6. A process for preparing a dye in convenient form which comprises agitating an aqueous dye paste with a solution of soap to produce a lather, drying said lather and reducing the dried mass to a colloid-like powder.

7. In a process for preparing a dye powder from insoluble organic coloring matter, the step of mixing with said matter a foaming agent and a protective colloid.

8. In a process for preparing a dye powder from insoluble organic coloring matter the step of mixing with said matter a foaming agent, a protective colloid and a highly soluble diluent.

9. A process for preparing a vat dye in dispersible form which comprises agitating an aqueous dye paste with a solution of soap, dextrine and sugar until a stiff lather is produced, drying said lather and reducing the dried mass to a colloid-like state of subdivision.

10. A dye powder comprising a uniform mixture of an anthraquinone vat dye and a foaming agent.

11. A dye powder comprising a water insoluble organic dye and a soap, said powder becoming highly dispersed when mixed with water.

12. A dye powder comprising a water insoluble organic dye, a foaming agent and a protective colloid, said powder becoming highly dispersed when mixed with water.

13. A dye powder comprising a water insoluble organic dye, a foaming agent, a protective colloid and a highly soluble diluent, said powder becoming highly dispersed when mixed with water.

14. A dye powder comprising a water insoluble organic dye, a soap and dextrine, said powder becoming highly dispersed when mixed with water.

15. A dye powder comprising a water insoluble organic dye, a soap, dextrine and sugar, said powder becoming highly dispersed when mixed with water.

16. A dry porous mass adapted to be reduced to a colloid-like powder, said mass comprising an anthroquinone vat dye and a foaming agent.

17. A dry porous mass adapted to be reduced to a colloid-like powder, said mass comprising a water insoluble organic dye, a foaming agent and a protective colloid.

18. A dry porous mass adapted to be reduced to a colloid-like powder, said mass comprising a water insoluble organic dye, a foaming agent, a protective colloid and a highly soluble diluent.

19. A dry porous mass adapted to be reduced to a colloid-like powder, said mass comprising a water insoluble organic dye, a soap, dextrine and sugar.

20. A process for preparing a dry dye in dispersible form from water insoluble organic coloring matter which comprises working up said matter into a lather, drying said lather to form a porous mass and reducing said mass to a colloid-like powder.

21. A lather comprising an anthraquinone vat dye and a foaming agent, said lather being adapted for reduction to a colloid-like powder.

22. A lather comprising an anthraquinone vat dye, a foaming agent and a protective colloid, said lather being adapted for reduction to a colloid-like powder.

23. A lather comprising water insoluble organic coloring matter, a foaming agent, a protective colloid and a highly soluble diluent, said lather being adapted for reduction to a colloid-like powder.

24. A lather comprising water insoluble organic coloring matter, a soap and dextrine, said lather being adapted for reduction to a colloid-like powder.

25. A process for producing a dye in dry dispersible form from water insoluble organic coloring matter, which comprises working up said matter into a lather and reducing said lather to a dry colloid-like powder.

26. A process for producing a dye in dry dispersible form from water insoluble coloring matter which comprises beating a mixture of said matter and a foaming agent to a froth and reducing said froth to a dry colloid-like powder.

27. A process for producing in dry dispersible form a dye from water insoluble coloring matter, which comprises beating a mixture of said matter, a foaming agent and a protective colloid to a froth and reducing said froth to a dry colloid-like powder.

28. A dye composition comprising a uniform mixture of a water insoluble dye, a foaming agent and a protective colloid.

29. A dye composition comprising a uniform mixture of a water insoluble dye, a foaming agent, a protective colloid and a highly water-soluble diluent.

In testimony whereof we affix our signatures.

OAKLEY M. BISHOP.
MERVILLE S. THOMPSON.